(12) United States Patent
Immonen et al.

(10) Patent No.: US 11,130,258 B2
(45) Date of Patent: Sep. 28, 2021

(54) SYSTEM AND A METHOD FOR PROCESSING MATERIAL

(71) Applicant: Kompopat Oy, Konnunsuo (FI)

(72) Inventors: Ville Immonen, Konnunsuo (FI); Timo Kärki, Imatra (FI); Juha Varis, Lappeenranta (FI)

(73) Assignee: KOMPOPAT OY, Konnunsuo (FI)

( * ) Notice: Subject to any disclaimer, the term of this patent is extended or adjusted under 35 U.S.C. 154(b) by 0 days.

(21) Appl. No.: 17/094,305

(22) Filed: Nov. 10, 2020

(65) Prior Publication Data
US 2021/0178634 A1   Jun. 17, 2021

(30) Foreign Application Priority Data
Dec. 12, 2019 (EP) .................................... 19215455

(51) Int. Cl.
*B29B 9/08* (2006.01)
*B29B 17/00* (2006.01)
*B29K 105/26* (2006.01)

(52) U.S. Cl.
CPC ............ *B29B 9/08* (2013.01); *B29B 17/0026* (2013.01); *B29K 2105/26* (2013.01)

(58) Field of Classification Search
CPC ............ B29B 17/0026; B29B 17/0036; B29B 2017/0031; B29B 9/08; Y02W 30/62; B29C 43/00–58; B01J 2/20
See application file for complete search history.

(56) References Cited

U.S. PATENT DOCUMENTS 3,193,601 A * 7/1965 Billingsley ............. B29B 17/00
264/142
3,827,213 A * 8/1974 Matzinger ........... B29B 17/0026
53/530
(Continued)

FOREIGN PATENT DOCUMENTS

DE        2 229 535      2/1973
DE        88 10 696     11/1988
(Continued)

OTHER PUBLICATIONS

Translation of DE 10 2014 009883.*
Extended European Search Report for 19215455.7 dated Feb. 10, 2020, 9 pages.

*Primary Examiner* — Mary Lynn F Theisen
(74) *Attorney, Agent, or Firm* — Nixon & Vanderhye

(57) ABSTRACT

A system for processing material, for example recycled material, comprises a compacting device (101) for compacting the material and a treatment device (102) for agglomerating, pelletizing, or nozzle-extruding the compacted material. The compacting device comprises a compacting chamber (103) and a compacting element (104) that is moveable in the compacting chamber to reduce the volume of the compacting chamber so as to compact the material to be delivered to the treatment device. As the material is compacted prior to being agglomerated, pelletized, or nozzle-extruded, supply of the material to the treatment device can be more reliable especially when the material is chopped waste plastic or other fluffy material including much air. Furthermore, efficiency of the agglomeration, pelletizing, or nozzle-extruding is improved because the compacting increases density of the material prior to the agglomeration, pelletizing, or nozzle-extruding process.

13 Claims, 7 Drawing Sheets

(56) References Cited

U.S. PATENT DOCUMENTS

| | | | | |
|---|---|---|---|---|
| 5,356,278 | A | * | 10/1994 | Reetz .................... B29C 70/081 425/111 |
| 5,494,626 | A | * | 2/1996 | Middleton .............. B29B 13/10 264/115 |
| 5,776,386 | A | | 7/1998 | Bancroft |
| 6,132,655 | A | * | 10/2000 | Ray ....................... B09B 3/0033 264/321 |
| 2006/0208376 | A1 | | 9/2006 | Gaskarth |
| 2010/0092794 | A1 | * | 4/2010 | Aylmore ................ B29C 48/91 428/542.8 |
| 2012/0199675 | A1 | | 8/2012 | Kulesa et al. |
| 2012/0258189 | A1 | * | 10/2012 | Wilhelm ............. B29B 17/0036 425/217 |
| 2013/0186573 | A1 | | 7/2013 | Kulesa et al. |
| 2014/0252142 | A1 | | 9/2014 | Rice |
| 2016/0167254 | A1 | | 6/2016 | Cushing et al. |
| 2017/0157825 | A1 | * | 6/2017 | Weber ................ B29B 17/0026 |

FOREIGN PATENT DOCUMENTS

| | | |
|---|---|---|
| DE | 10 2014 009 883 | 9/2015 |
| EP | 0 397 280 | 11/1990 |
| EP | 0 689 882 | 1/1996 |
| FR | 2 706 792 | 12/1994 |
| JP | H01-146708 | 6/1989 |

\* cited by examiner

SYSTEM AND A METHOD FOR PROCESSING MATERIAL

CROSS-REFERENCE TO RELATED APPLICATIONS

This application is a Non-Provisional application which claims priority to EP 19215455.7 filed Dec. 12, 2019, the entire contents of each of which is hereby incorporated by reference.

FIELD OF THE DISCLOSURE

The disclosure relates to a system for processing material that can be for example recycled material such as e.g. chopped waste plastic. The system is suitable for converting the material and possible one or more additives into agglomerates, pellets, or results of nozzle-extruding. Furthermore, the disclosure relates to a method for processing material.

BACKGROUND

In many cases, there is a need to convert material and possible one or more additives into agglomerates, pellets, or results of nozzle-extruding for further use. The material can be for example waste plastic with low bulk density, for example fibres, film, stretch film, foamed materials, powder, or fine particles. For another example, the material can be textile-based waste material such as e.g. crushed rags. Publication FR2706792 describes a method for granulating recycled waste plastic. The method comprises compacting the recycled waste plastic with a screw conveyor and thereafter pressing the recycled waste plastic through apertures in a die provided with a face cutter that cuts the output into granules. Heat needed by the process is provided by mechanical action directed to the plastic material, and this heat is enough to melt and agglomerate the plastic material into relatively homogenous granules.

Publication US20060208376 describes a system for making drainage elements from chopped waste plastic. The system comprises a screw conveyor having a screw and a twin-plate agglomerator having plates so that one of the plates is closely adjacent to and rotatable with respect to the other plate. The screw conveyor compacts the chopped waste plastic and delivers the chopped waste plastic to the twin-plate agglomerator. The chopped waste plastic is agglomerated between the plates, and mechanical energy imparted by the plates heats the plastic material to about the melting point of the plastic material. Hot noodles of the plastic material extrude from an outlet of the plates. The noodles are conveyed to a chute of a compactor funnel which has an outlet disposed closely above an output conveyor belt.

In the above-described systems for processing material, a screw conveyor is used for compacting and supplying the material and possible additives to a treatment device that converts the material and the possible additives to agglomerates, pellets, or other products. An inconvenience related to a screw conveyer is that a compression force and a compression ratio are challenging to adjust in accordance with initial bulk density, i.e. fluffiness, of material to be processed and/or in accordance with desired bulk density after the bulk density has been increased by the screw conveyor.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying and non-limiting embodiments.

In accordance with the invention, there is provided a new system for processing material that can be for example recycled material such as e.g. chopped waste plastic or crushed rags. A system according to the invention comprises:
- a compacting device for compacting the material, and
- a treatment device for agglomerating, pelletizing, or nozzle-extruding the compacted material, wherein the compacting device comprises a compacting chamber and a compacting element moveable in the compacting chamber to reduce the volume of the compacting chamber so as to compact the material to be delivered to the treatment device. In this document, the word "compacting" means pressing the material and thereby removing air and/or other gas and/or liquid, e.g. water, from the material.

As the compacting device comprises the compacting chamber whose volume is changeable by the compacting element, it is straightforward to adjust a compression force and/or a compression ratio in accordance with the initial bulk density, i.e. the fluffiness, of the material to be processed and/or in accordance with desired bulk density after the bulk density has been increased by the compacting device.

Furthermore, the compacting device facilitates supply of the material to the treatment device. For example, if there were a mere supply funnel in lieu of the compacting device, there would be a significant risk of clogs in the supply funnel.

In accordance with the invention, there is provided also a new method for processing material. A method according to the invention comprises:
- compacting the material, and
- agglomerating, pelletizing, or nozzle-extruding the compacted material, wherein the compacting the material comprises placing the material into a compacting chamber and moving a compacting element in the compacting chamber to reduce the volume of the compacting chamber so as to compact the material.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
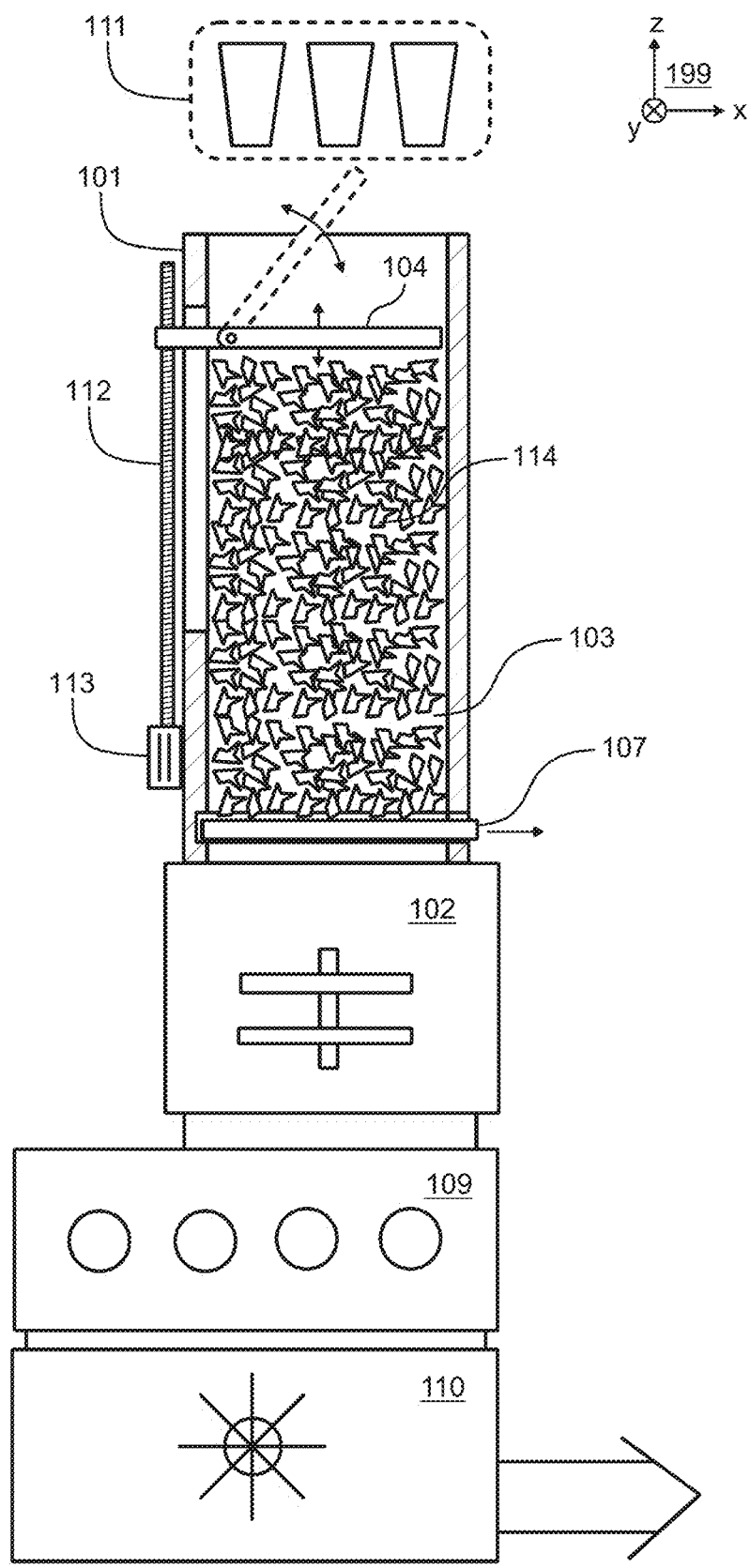
FIG. 1 illustrates a system according to an exemplifying and non-limiting embodiment for agglomerating material.

FIG. 1 illustrates a system according to an exemplifying and non-limiting embodiment for agglomerating material 114. The material 114 can be for example recycled material such as e.g. waste plastic with a low bulk density, e.g. film, stretch film, foamed plastic, plastic powder, or fine plastic particles. For another example, the material 114 can be textile-based waste material such as crushed rags. The system comprises a compacting device 101 for compacting the material 114 and a treatment device 102 for processing the compacted material. In FIG. 1, a casing of the compacting device 101 is shown as a section view. In this exemplifying system, the treatment device 102 is an agglomerator for agglomerating the compacted material. In cases where the material 114 comprises plastic, the treatment device 102 can be for example a twin-plate agglomerator that comprises plates so that one of the plates is closely adjacent to and rotatable with respect to the other plate. The material is agglomerated between the plates, and mechanical energy imparted by the plates heats up the material to about the melting point of the material. Hot agglomerates of the material extrude from an outlet of the plates. It is also possible that the treatment device 102 is another kind of agglomerator, and thus the exemplifying embodiment illustrated in FIG. 1 is not limited to any specific agglomerator type or types.

The compacting device 101 comprises a compacting chamber 103 and a compacting element 104 moveable in the compacting chamber to reduce the volume of the compacting chamber 103 and thereby to compact the material 114. In this exemplifying system, the compacting element 104 is linearly moveable in the compacting chamber 103. It is however also possible that in a system according to another exemplifying and non-limiting embodiment, the compacting element is moveable along a curved path, e.g. along an arc of a circle, in the compacting chamber. In the exemplifying system illustrated in FIG. 1, the compacting device 101 comprises a treaded rod 112 and an electric motor 113 for rotating the threaded rod to move the compacting element 104 vertically in parallel with the z-axis of a coordinate system 199. It is however also possible to move the compacting element 104 with the aid of a hydraulic mechanism, a pneumatic mechanism, or some other suitable moving mechanics. As shown in FIG. 1, the compacting element 104 comprises an openable lid for allowing the material 114 be supplied to the compacting chamber 103. The lid has a locking mechanism for preventing the lid from opening when the compacting element 104 is compacting the material 114. The locking mechanism is not presented in FIG. 1. The compacting chamber 103 is not hermetic and thus air can come out from the compacting chamber 103 when the volume of the compacting chamber is reduced by moving the compacting element 104. In the exemplifying case shown in FIG. 1, the compacting element 104 does not hermetically seal the compacting chamber 103. It is also possible that the compacting chamber 103 is provided with air outputting ducts via which air can flow out from the compacting chamber 103 during a compacting process.

Gravimetric or volumetric dosing can be used when supplying material such as e.g. chopped waste plastic or crushed rags to the compacting chamber 103. For example, an inner wall of the compacting chamber 103 can be provided with a scale that shows volume or weight of the material that has been supplied to the compacting chamber 103. It is also possible that the compacting chamber 103 is provided with one or more photocells and/or other sensors for volumetric measurement of the material that has been supplied to the compacting chamber 103. It is also possible that the system comprises a supply device for gravimetric or volumetric dosing of material such as e.g. chopped waste plastic or crushed rags to the compacting chamber 103.

The exemplifying system illustrated in FIG. 1 comprises a closing element 107 for closing a passage from the compacting chamber 103 to the treatment device 102 when the compacting element 104 is compacting the material 114. The closing element 107 makes it possible to run the system in a pipelined operational mode so that one batch of the material is being compacted in the compacting device 101 simultaneously when a previous batch of the material is being agglomerated in the treatment device 102. The above-described pipelined operational mode improves the throughput of the system.

The exemplifying system illustrated in FIG. 1 further comprises a cooler 109 for cooling the agglomerated material. Temperature of the agglomerates coming out from the treatment device 102 can be for example about 200° C. and temperature of the agglomerates coming out from the cooler 109 can be for example from 40° C. to 90° C.

The exemplifying system illustrated in FIG. 1 further comprises a crusher 110 for receiving the agglomerates from the cooler 109 and for crushing at least largest ones of the agglomerates into smaller pieces.

The exemplifying system illustrated in FIG. 1 further comprises dosing elements 111 for feeding additives to the compacting chamber 103. The dosing elements 111 can be provided with weighing means for enabling gravimetric dosing and/or with volume dosing means for enabling volumetric dosing. It is also possible that the additives are supplied to the compacting chamber 103 in packages e.g. bags each containing a predetermined mass or volume of predetermined additive or predetermined mass or volume of a predetermined mixture of additives. The additives can be for example fillers, color pigments, plasticizers, adhesives, etc.

Figure 2:
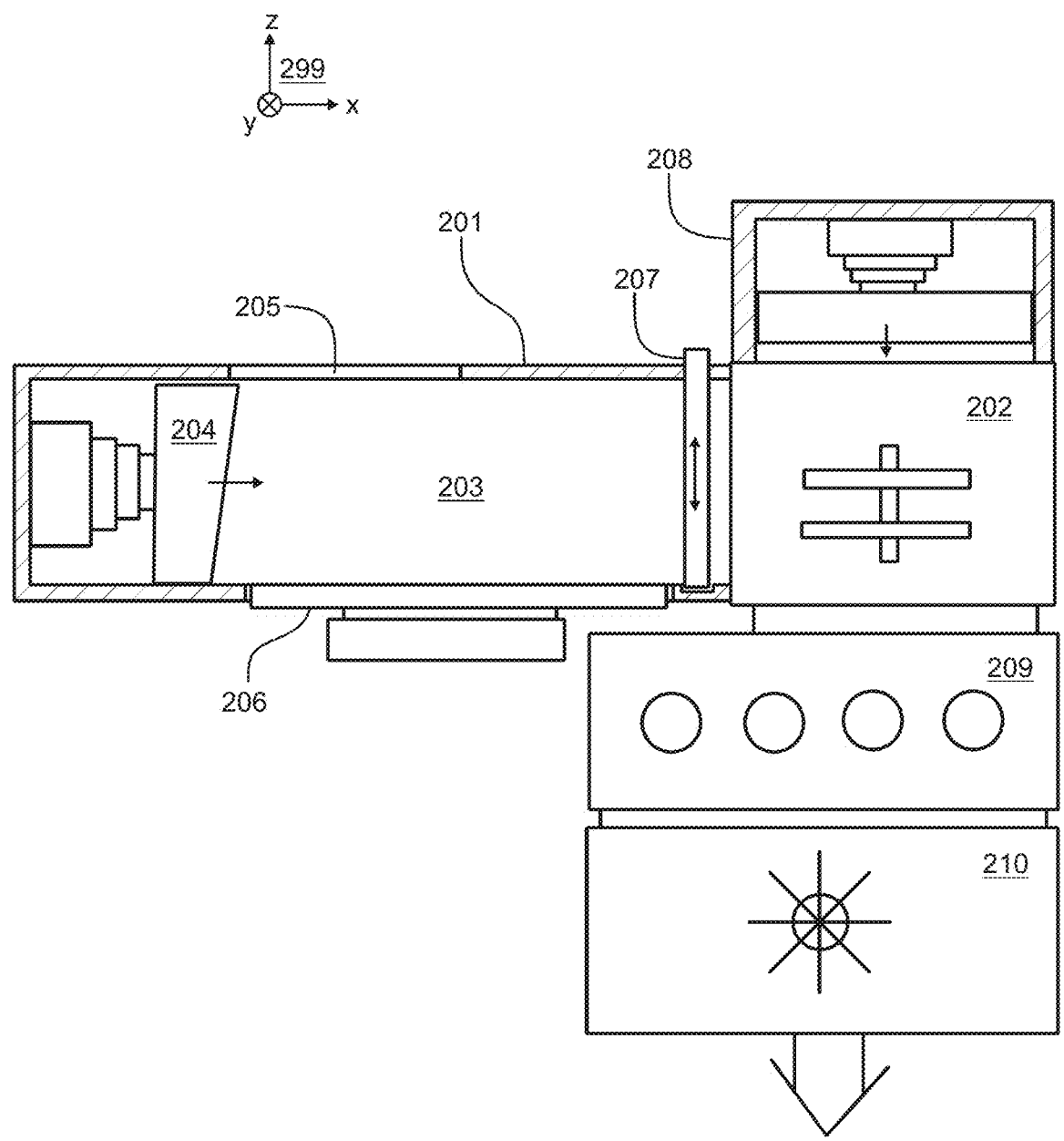
FIG. 2 illustrates a system according to another exemplifying and non-limiting embodiment for agglomerating material.

FIG. 2 illustrates a system according to an exemplifying and non-limiting embodiment for agglomerating material, e.g. recycled material such as chopped waste plastic. The material is not shown in FIG. 2. The system comprises a compacting device 201 for compacting the material and a treatment device 202 for agglomerating the compacted material. In FIG. 2, a casing of the compacting device 201 is shown as a section view. The treatment device 202 can be for example a twin-plate agglomerator or some other suitable agglomerator. The compacting device 201 comprises a compacting chamber 203 and a compacting element 204 that is moveable in the compacting chamber 203 to reduce the volume of the compacting chamber 203 and thereby to compact the material to be delivered to the treatment device 202. The compacting element 204 is linearly moveable in the compacting chamber 203. In this exemplifying case, a direction of movement of the compacting element 204 is horizontal and parallel with the x-axis of a coordinate system 299. An upper part of the compacting device 201 has an opening 205 for receiving the material from above. The compacting chamber 203 is not hermetic and thus air can come out from the compacting chamber 203 when the volume of the compacting chamber is reduced by moving the compacting element 204. In the exemplifying case shown on FIG. 2, the compacting element 204 does not hermetically seal the compacting chamber 203. It is also possible that the compacting chamber 203 is provided with air outputting ducts, valves, or the like via which air can flow out from the compacting chamber 203 during a compacting process.

The exemplifying system illustrated in FIG. 2 comprises a closing element 207 for closing a passage from the compacting chamber 203 to the treatment device 202 when the compacting element 204 is compacting the material to be agglomerated. The closing element 207 makes it possible to run the system in a pipelined operational mode so that one batch of the material is being compacted in the compacting device 201 simultaneously when a previous batch of the material is being agglomerated in the treatment device 202.

The exemplifying system illustrated in FIG. 2 comprises a weighing device 206 for weighing a batch of material contained by the compacting chamber 203.

In the exemplifying system illustrated in FIG. 2, the treatment device 202 comprises a pressing mechanism 208 for compacting a batch of the material that is currently being agglomerated by the treatment device 202. In FIG. 2, a casing of the pressing mechanism 208 is shown as a section view. The pressing mechanism 208 makes it possible to adjust the bulk density of the material during the agglomeration process.

The exemplifying system illustrated in FIG. 2 further comprises a cooler 209 for cooling the agglomerates produced by the treatment device 202 and a crusher 210 for crushing at least largest ones of the agglomerates into smaller pieces. The system may further comprise one or more dosing elements for feeding one or more additives to the compacting chamber 203. The dosing elements are not shown in FIG. 2.

Figure 3:
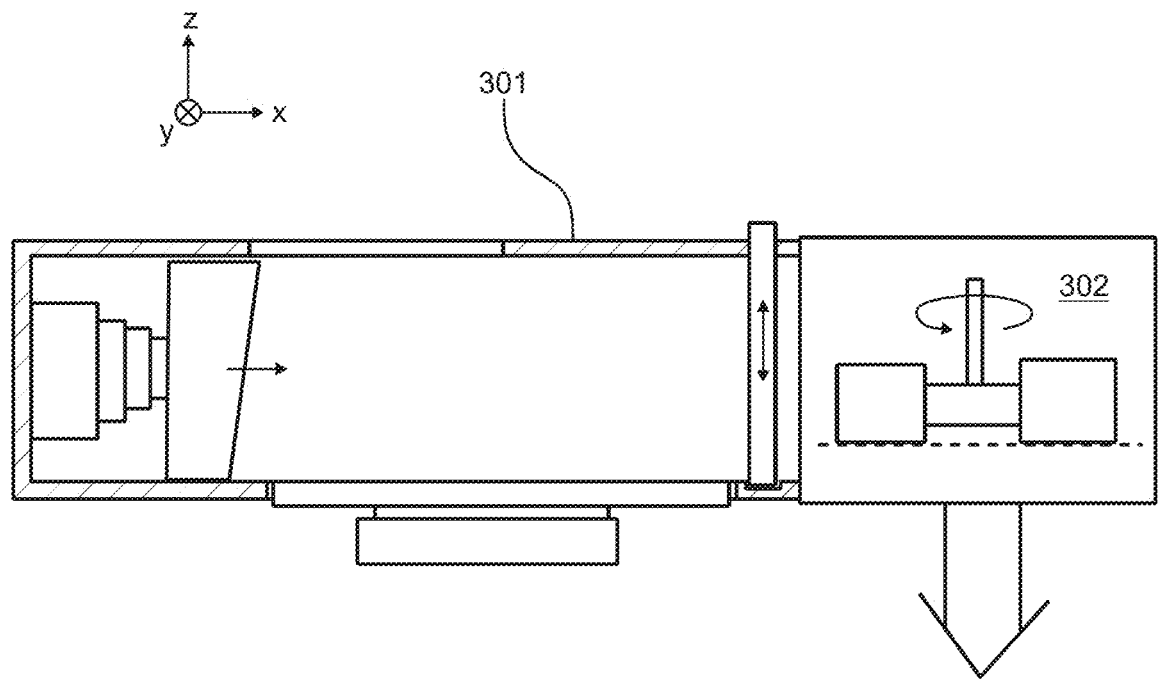
FIG. 3 illustrates a system according to an exemplifying and non-limiting embodiment for pelletizing material.

FIG. 3 illustrates a system according to an exemplifying and non-limiting embodiment for processing material, e.g. recycled material such as chopped waste plastic. The system comprises a compacting device 301 for compacting the material and a treatment device 302 for processing the compacted material. In this exemplifying case, the treatment device 302 is a pelletizing device that produces pellets composed of the material and possible additives. The compacting device 301 can be for example such as the compacting device 201 shown in FIG. 2.

Figure 4:
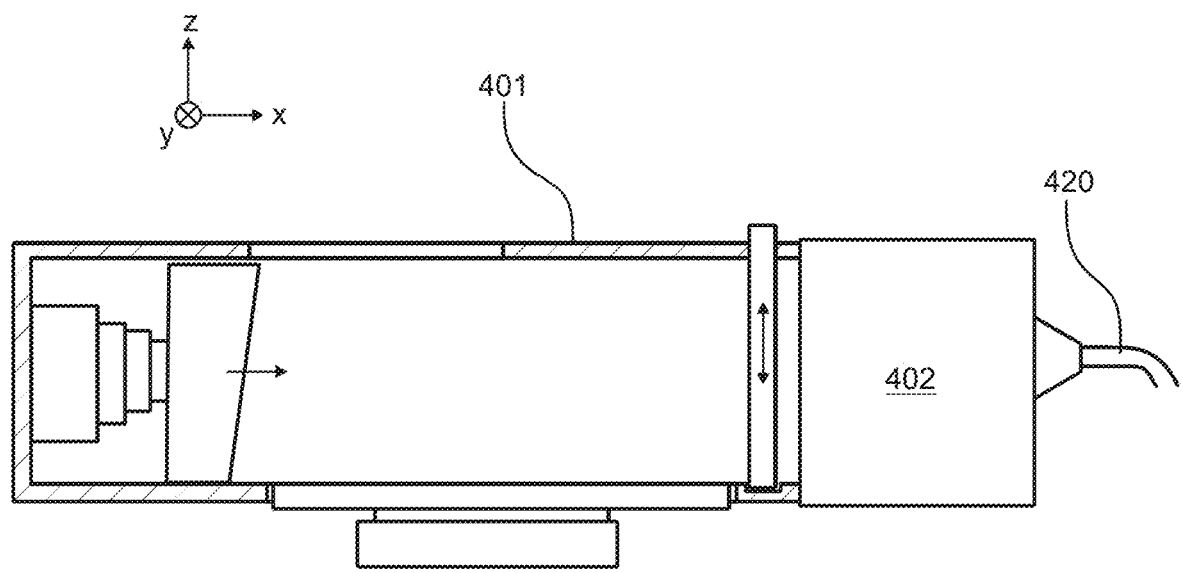
FIG. 4 illustrates a system according to an exemplifying and non-limiting embodiment for nozzle-extruding material.

FIG. 4 illustrates a system according to an exemplifying and non-limiting embodiment for processing material, e.g. recycled material such as chopped waste plastic. The system comprises a compacting device 401 for compacting the material and a treatment device 402 for processing the compacted material. In this exemplifying case, the treatment device 402 is a nozzle-extruder that produces an extruded bar 420 composed of the material and possible additives. The compacting device 401 can be for example such as the compacting device 201 shown in FIG. 2.

Figure 5A:
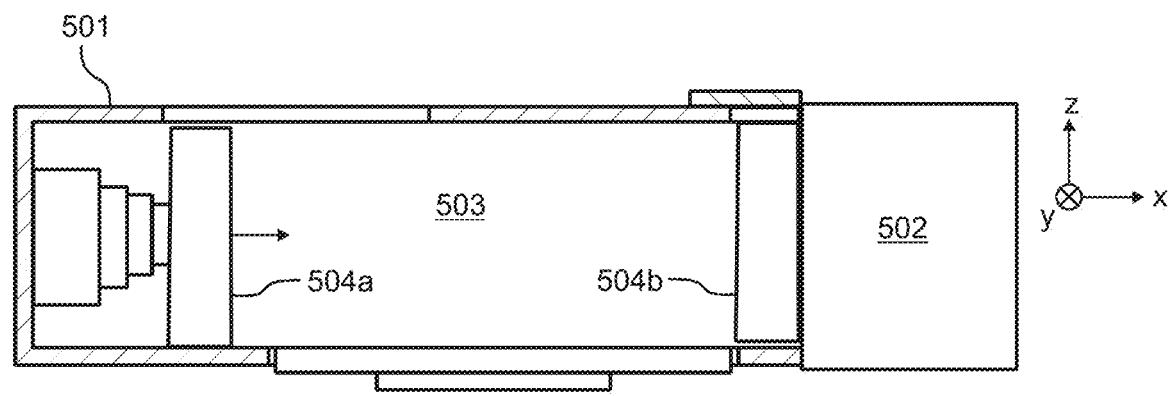
FIGS. 5a, 5b, and 5c illustrate a system according to an exemplifying and non-limiting embodiment for processing material.
Figure 5B:
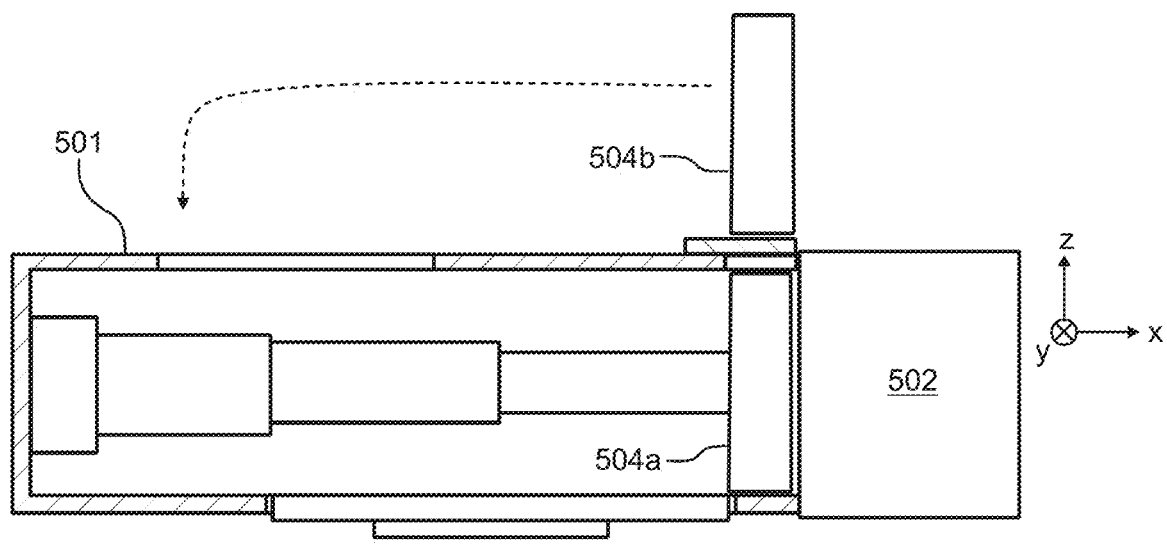
Figure 5C:
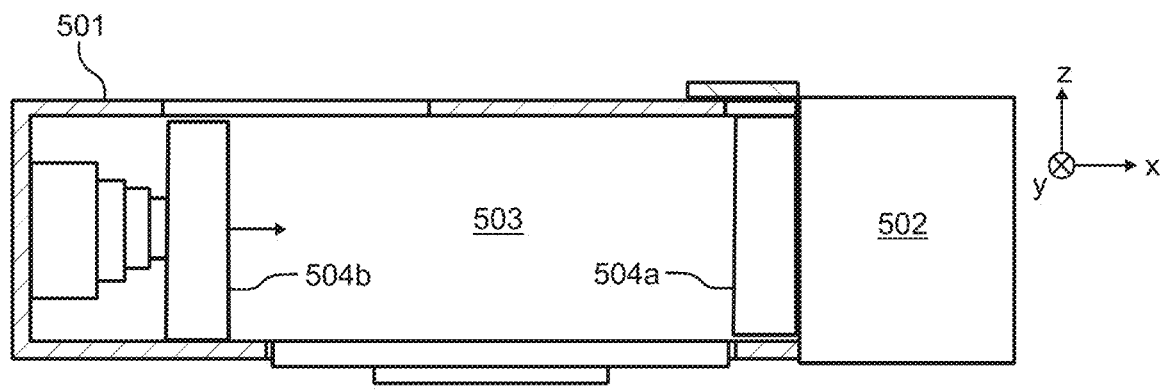

FIGS. 5a, 5b, and 5c illustrate a system according to an exemplifying and non-limiting embodiment for processing material. The system comprises a compacting device 501 for compacting the material and a treatment device 502 for agglomerating, pelletizing, or nozzle-extruding the compacted material. The compacting device comprises a compacting chamber 503 and elements 504a and 504b. In this exemplifying system, each of the elements 504a and 504b is, in turn, used as a compacting element moveable in the compacting chamber 503 and the other one of the elements 504a and 504b is used as a closing element for closing a passage from the compacting chamber 503 to the treatment device 502. In the exemplifying situation shown in FIG. 5a, the element 504a is ready for being used as the compacting element and the element 504b is used as the closing element. In the exemplifying situation shown in FIG. 5b, the element 504a has been used as the compacting element and the element 504b has been removed from the position shown in FIG. 5a to enable the element 504a to push the material to the treatment device 502. In the exemplifying situation shown in FIG. 5c, the element 504a is used as the closing element and the element 504b is, in turn, ready for being used as the compacting element. The operation continues so that the elements 504a and 504b are circulated in the system as illustrated in FIGS. 5a-5c. The elements 504a and 504b are advantageously shaped so that they can act as a wall of the treatment device 502. A system according to an exemplifying and non-limiting embodiment comprises three or more elements such as the above-mentioned elements 504a and 504b. In this exemplifying case, one or more elements are resting when two other elements are acting as the compacting element and the closing element. Thus, the wear rate of the elements is slower.

Figure 6A:
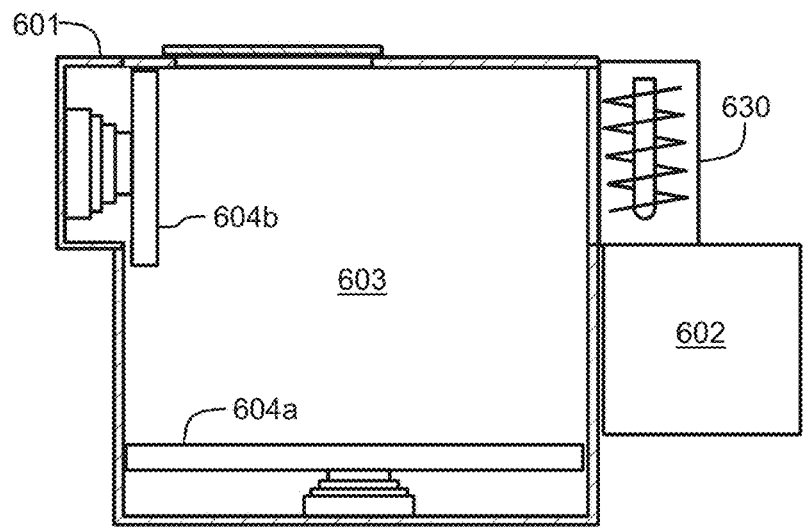
FIGS. 6a, 6b, and 6c illustrate a system according to an exemplifying and non-limiting embodiment for processing material.
Figure 6B:
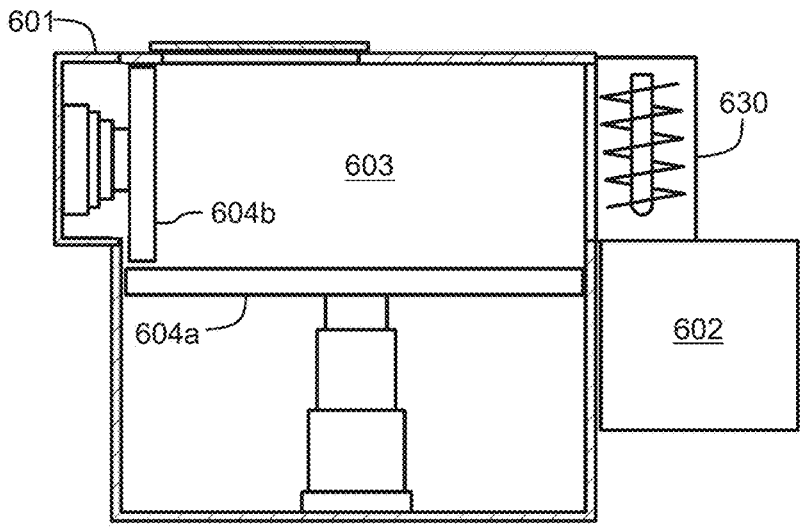
Figure 6C:
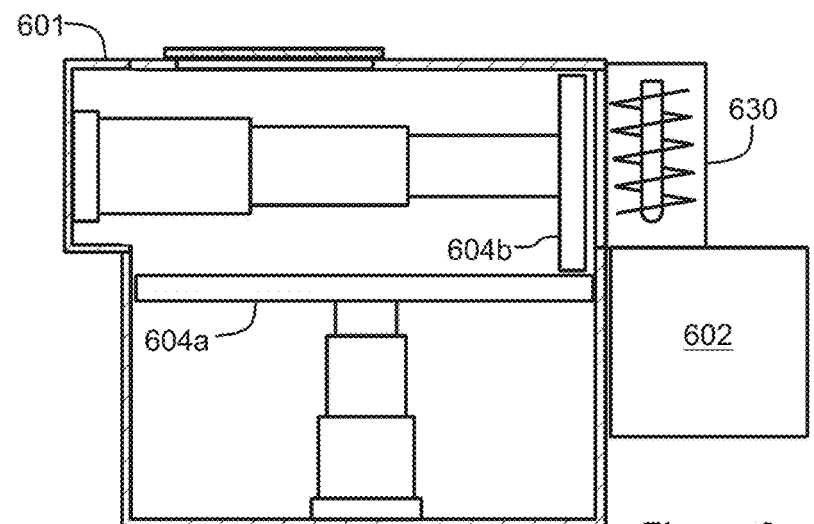
Figure 7A:
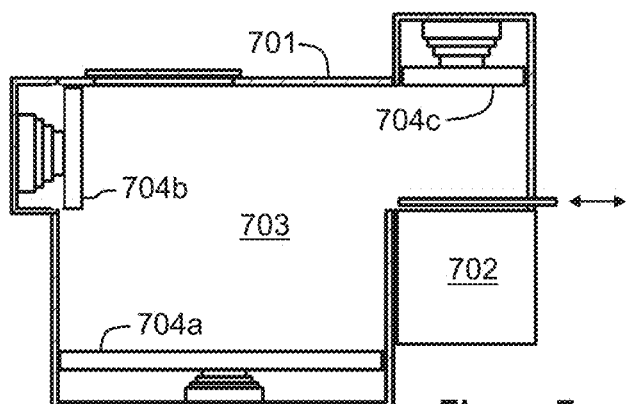
FIGS. 7a, 7b, 7c, and 7d illustrate a system according to an exemplifying and non-limiting embodiment for processing material.
Figure 7B:
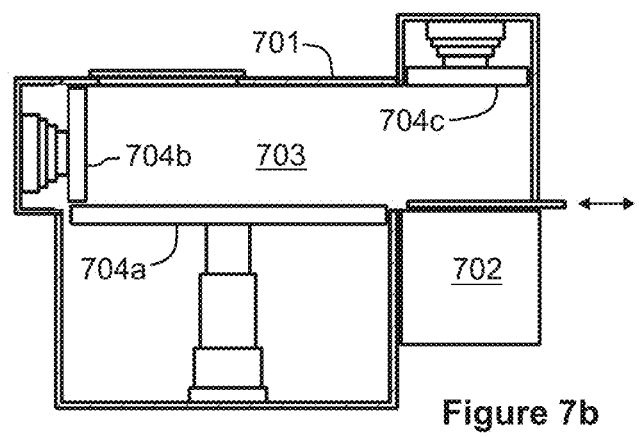
Figure 7C:
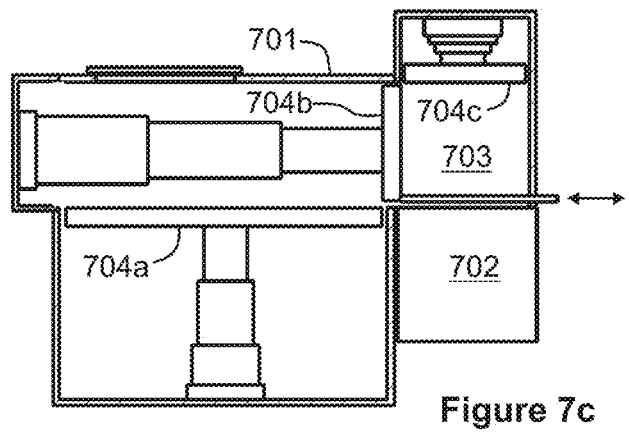
Figure 7D:
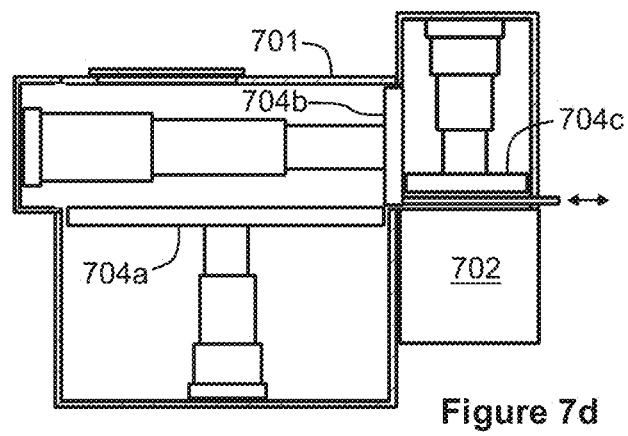

FIGS. 6a, 6b, and 6c illustrate a system according to an exemplifying and non-limiting embodiment for processing material. The system comprises a compacting device 601 for compacting the material and a treatment device 602 for agglomerating, pelletizing, or nozzle-extruding the compacted material. Furthermore, the system comprises a screw extruder/conveyor 630 or other similar feeding system for supplying the compacted material to the treatment device 602. The compacting device 601 comprises a compacting chamber 603 and compacting elements 604a and 604b. The compacting elements are moveable in the compacting chamber 603 to reduce the volume of the compacting chamber so as to compact the material to be delivered to the treatment device 602. In this exemplifying case, the compacting element 604a is moveable in a first direction and the compacting element 604b is moveable in a second direction perpendicular to the first direction. The compacting elements 604a and 604b are operable in a two-phased way so that the compacting element 604a is moved from a position shown in FIG. 6a to a position shown in FIG. 6b to reduce the volume of the compacting chamber 603, and subsequently the compacting element 604b is moved from a position shown in FIGS. 6a and 6b to a position shown in FIG. 6c to further reduce the volume of the compacting chamber 603. The arrangement illustrated in FIGS. 6a-6c, makes it possible to design the dimensions and dimension rations of the compacting chamber 603 more freely than when using only one compacting element.

FIGS. 7a, 7b, 7c, and 7d illustrate a system according to an exemplifying and non-limiting embodiment for processing material. The system comprises a compacting device 701 for compacting the material and a treatment device 702 for agglomerating, pelletizing, or nozzle-extruding the compacted material. The compacting device 701 comprises a compacting chamber 703 and compacting elements 704a, 704b, and 704c. The compacting elements are moveable in the compacting chamber 703 to reduce the volume of the compacting chamber so as to compact the material to be delivered to the treatment device 702. In this exemplifying case, the compacting element 704a is moveable in a first direction, the compacting element 704b is moveable in a second direction perpendicular to the first direction, and the compacting element 704c is moveable in a third direction perpendicular to the second direction. The compacting elements 704a-704c are operable in a three-phased way so that the compacting element 704a is moved from a position shown in FIG. 7a to a position shown in FIG. 7b to reduce the volume of the compacting chamber 703, and subsequently the compacting element 704b is moved from a position shown in FIGS. 7a and 7b to a position shown in FIG. 7c to further reduce the volume of the compacting chamber 703, and finally the compacting element 704c is moved from a position shown in FIGS. 7a-7c to a position shown in FIG. 7d to further reduce the volume of the compacting chamber 703.

Figure 8:
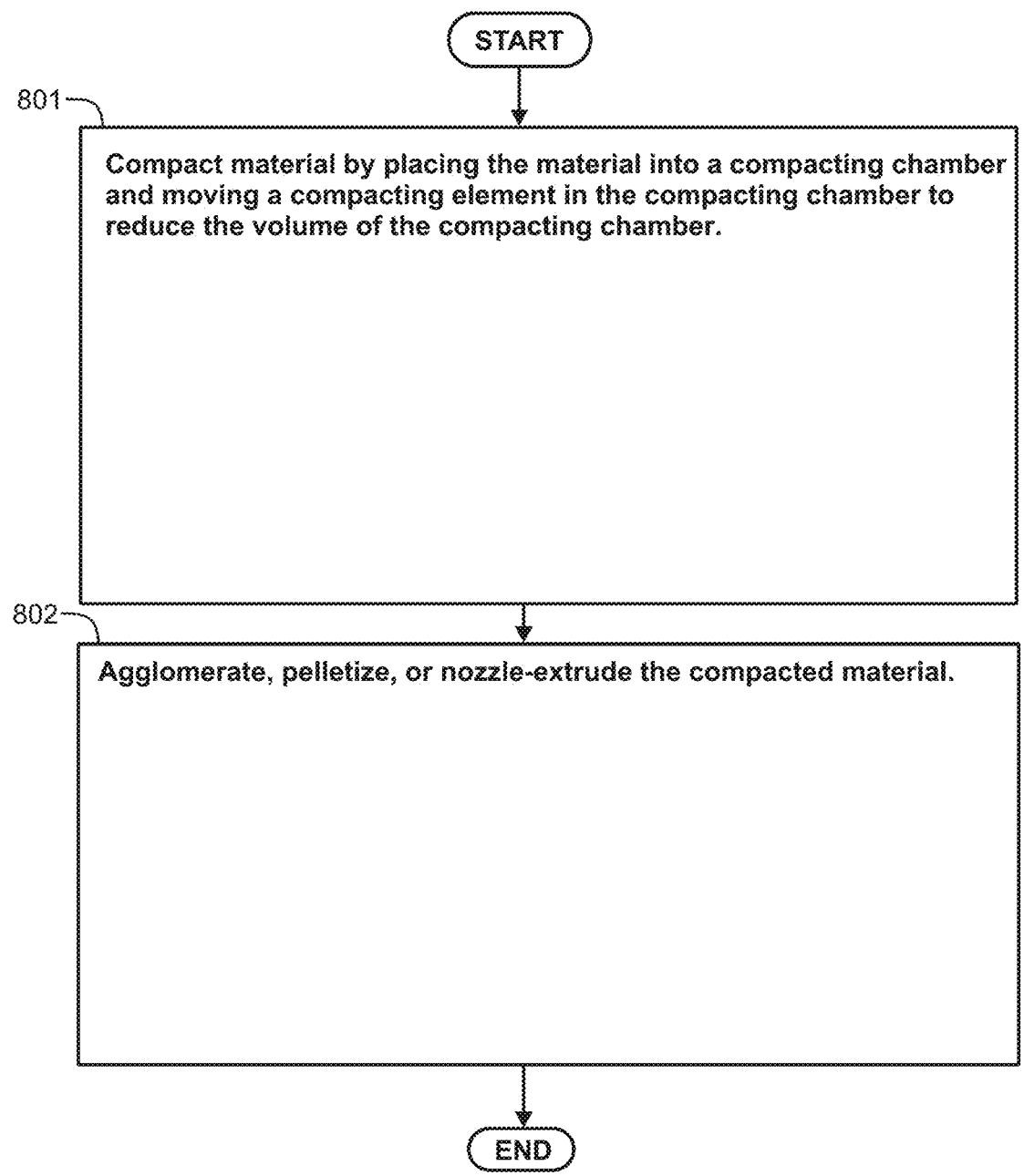
FIG. 8 shows a flowchart of a method according to an exemplifying and non-limiting embodiment for processing material.

FIG. 8 shows a flowchart of a method according to an exemplifying and non-limiting embodiment for processing material, e.g. recycled material such as chopped waste plastic. The method comprises the following actions:
 action 801: compacting the material, and
 action 802: agglomerating, pelletizing, or nozzle-extruding the compacted material,
wherein the material is compacted by placing the material into a compacting chamber and thereafter moving a compacting element in the compacting chamber to reduce the volume of the compacting chamber so as to compact the material.

In a method according to an exemplifying and non-limiting embodiment, the compacting element is moved linearly in the compacting chamber to reduce the volume of the compacting chamber.

In a method according to an exemplifying and non-limiting embodiment, the material is fed to the compacting chamber from above and thereafter the compacting element is moved horizontally to reduce the volume of the compacting chamber.

In a method according to an exemplifying and non-limiting embodiment, a passage from the compacting chamber to a treatment device for agglomerating, pelletizing, or nozzle-extruding is kept closed for a part of a time when the compacting element is moved, and subsequently the passage is opened to move the material to the treatment device. The above-described procedure enables pipelined operation so that one batch of the material is being compacted simultaneously when a previous batch of the material is being agglomerated, pelletized, or nozzle-extruded.

A method according to an exemplifying and non-limiting embodiment comprises weighing a batch of material contained by the compacting chamber.

In a method according to an exemplifying and non-limiting embodiment, the compacted material is agglomerated, the agglomerates of the material are cooled, and at least largest ones of the cooled agglomerates are crushed into smaller pieces.

A method according to an exemplifying and non-limiting embodiment comprises feeding one or more additives to the compacting chamber in order to mix the additives to the material to be agglomerated, pelletized, or nozzle-extruded.

The specific examples provided in the description given above should not be construed as limiting the applicability and/or the interpretation of the appended claims. Lists and groups of examples provided in the description given above are not exhaustive unless otherwise explicitly stated. For example, it is also possible that a system according to an exemplifying and non-limiting embodiment comprises one or more compacting elements that are hinged to a back and forth moving drive element so that each hinged compacting element pushes material towards a treatment device, e.g. an agglomerator, when the drive element moves towards the treatment device and each hinged compacting element is turned to a position in which the hinged compacting element does not substantially move the material when the drive element moves away from the treatment device.

What is claimed is:

1. A system for processing material, the system comprising:
 a compacting device for compacting the material; and
 a treatment device for agglomerating, pelletizing, or nozzle-extruding the compacted material,
 wherein the compacting device comprises a compacting chamber and a compacting element moveable in the compacting chamber to reduce a volume of the compacting chamber so as to compact the material to be delivered to the treatment device, and
 wherein the system further comprises a closing element for closing a passage from the compacting chamber to the treatment device when the compacting element is compacting the material and the treatment device is agglomerating, pelletizing, or nozzle-extruding a previous batch of the material.

2. The system according to claim 1, wherein the compacting element is linearly moveable in the compacting chamber to reduce the volume of the compacting chamber.

3. The system according to claim 2, wherein a direction of movement of the compacting element is horizontal and an upper part of the compacting device has at least one opening for receiving the material from above.

4. The system according to claim 1, wherein the compacting device further comprises a weighing device for weighing a batch of the material contained by the compacting chamber.

5. The system according to claim 1, wherein the system comprises elements for alternately operating as the compacting element and the closing element so that a first one of the elements is the compacting element when a second one of the elements is the closing element.

6. The system according to claim 1, wherein the treatment device comprises a pressing mechanism for compacting a batch of the material when the batch of the material is agglomerated, pelletized, or nozzle-extruded by the treatment device.

7. The system according to claim 1, wherein the treatment device is an agglomerator, and the system further comprises a cooler for cooling agglomerates produced by the treatment device.

8. The system according to claim 7, wherein the system further comprises a crusher for receiving the agglomerates from the cooler and for crushing at least part of the agglomerates.

9. The system according to claim 1, wherein the system further comprises one or more dosing elements for feeding one or more additives to the compacting chamber.

10. The system according to claim 1, wherein the compacting device comprises plural compacting elements moveable in the compacting chamber to reduce the volume of the compacting chamber, the compacting elements being operable one-after-another so that a first one of the compacting elements is configured to be moved in a first direction to reduce the volume of the compacting chamber and a second one of the compacting elements is configured to be moved subsequently in a second direction perpendicular to the first direction to further reduce the volume of the compacting chamber.

11. A method for processing material, the method comprising steps of:
  compacting the material; and
  agglomerating, pelletizing, or nozzle-extruding the compacted material,
  wherein the step of compacting the material comprises placing the material into a compacting chamber and moving a compacting element in the compacting chamber to reduce a volume of the compacting chamber so as to compact the material, and
  wherein a passage from the compacting chamber to a treatment device for agglomerating, pelletizing, or nozzle-extruding is kept closed when a first batch of the material is fed to the compacting chamber and then compacted by moving the compacting element and when a second batch of the material is being agglomerated, pelletized, or nozzle-extruded with the treatment device, and subsequently the passage is opened to move the first batch of the material from the compacting chamber to the treatment device.

12. The method according to claim 11, wherein the compacting element is moved linearly in the compacting chamber to reduce the volume of the compacting chamber.

13. The method according to claim 12, wherein the material is fed to the compacting chamber from above and thereafter the compacting element is moved horizontally to reduce the volume of the compacting chamber.

\* \* \* \* \*